United States Patent Office 3,356,481
Patented Dec. 5, 1967

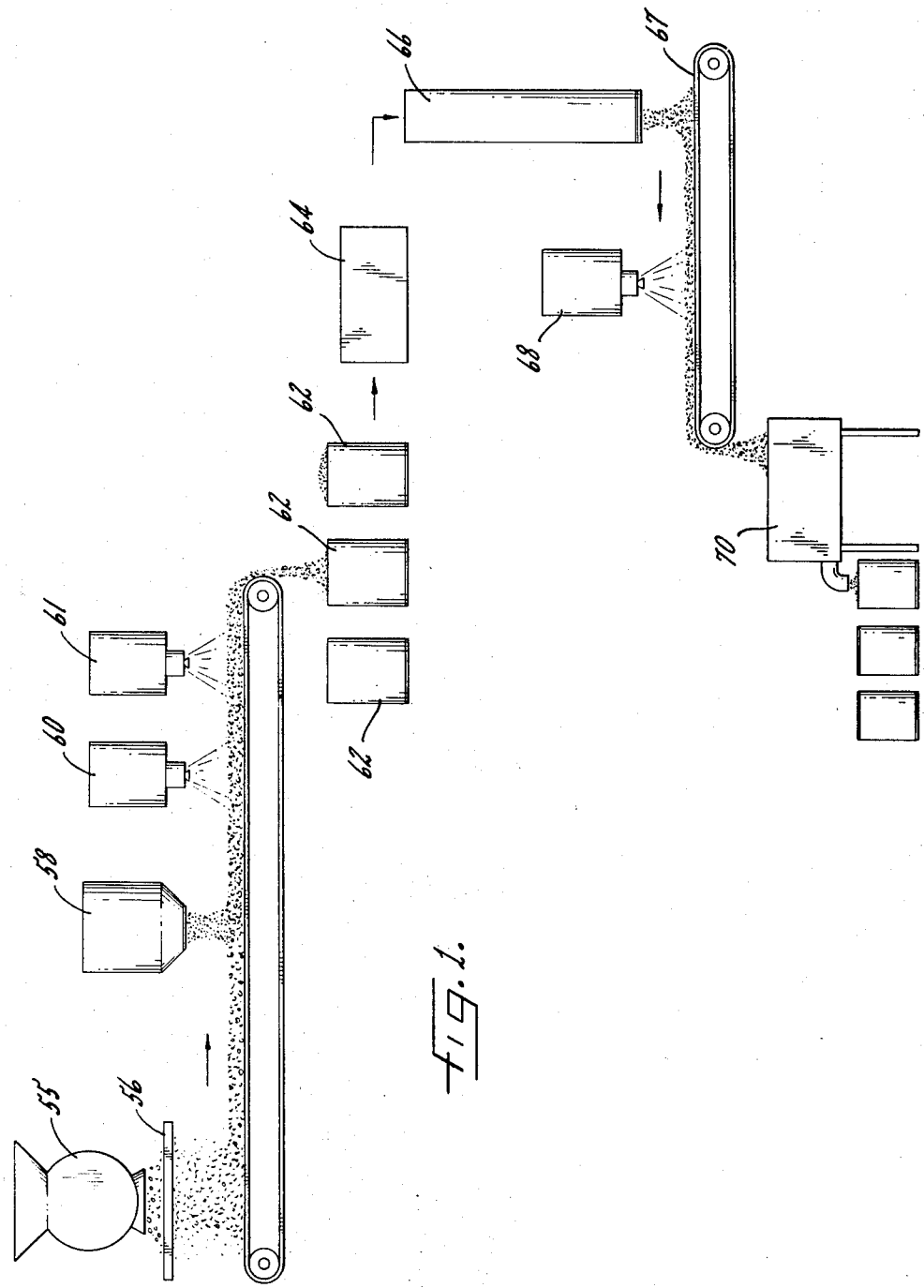

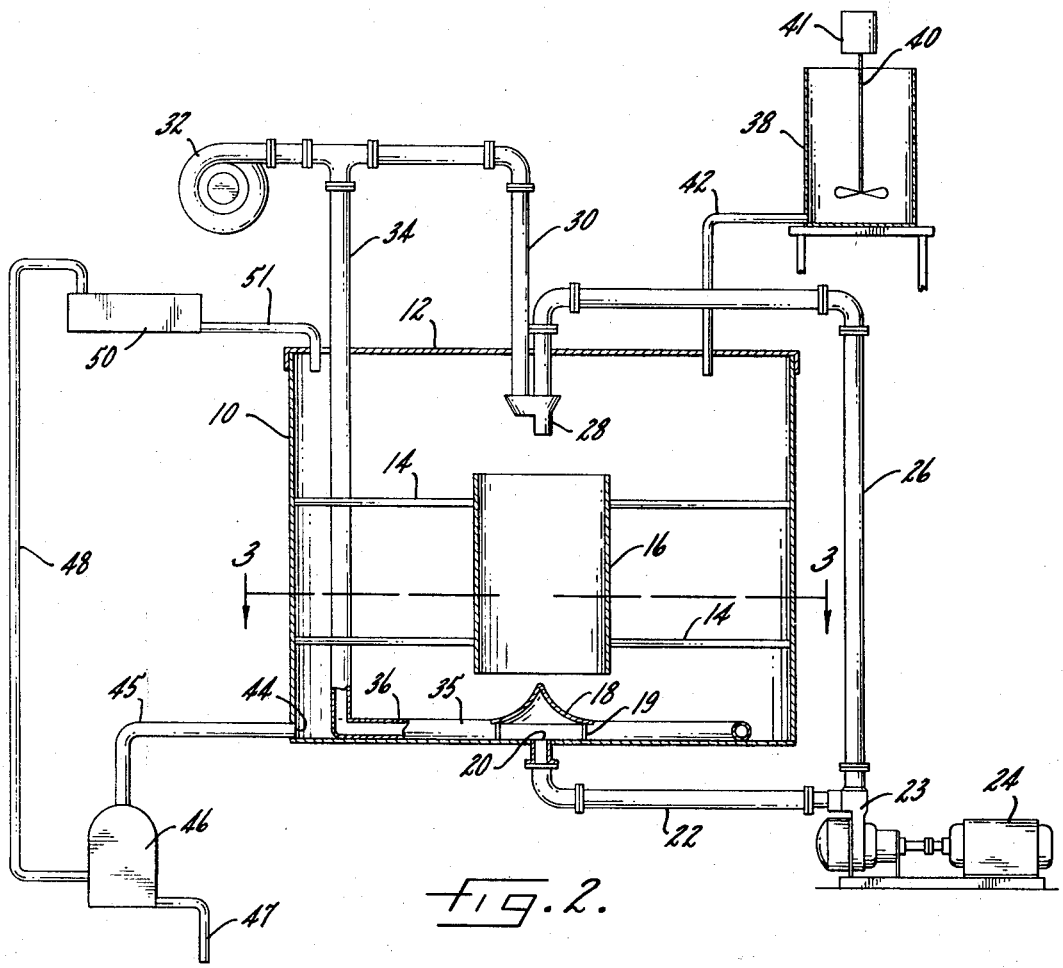
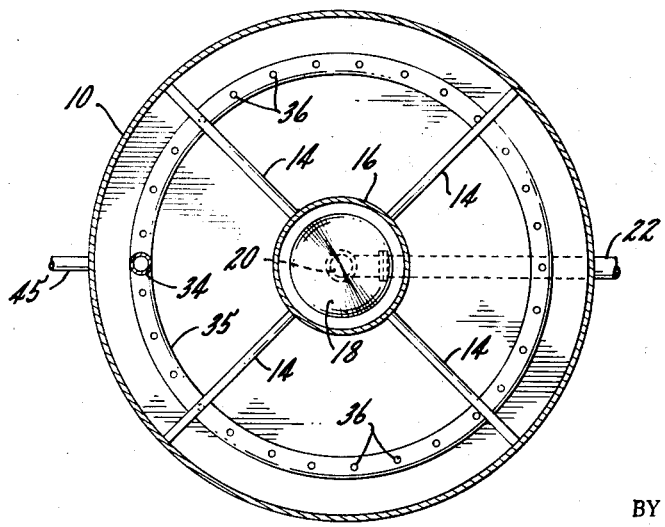

3,356,481
METHOD OF MAKING A SAWDUST-CONTAINING SOIL CONDITIONER
Roy D. Wininger, Owensboro, Ky., and Gerald E. Wilcox, West Lafayette, Ind., assignors, by mesne assignments, to Dolly Madison Industries, Inc., Louisville, Ky., a corporation of Minnesota
Filed Dec. 4, 1964, Ser. No. 415,972
7 Claims. (Cl. 71—9)

ABSTRACT OF THE DISCLOSURE

A method of making a soil conditioner comprising the steps of mixing a composted fungivorous sawdust culture with green sawdust and spraying a nitrogen-bearing nutrient solution onto said mixture. The mixture is then stored until it is partially decomposed into a soil conditioner.

---

This invention relates to a method and apparatus for making a soil conditioner from sawdust.

It is an object of the invention to provide a method of making a soil conditioner from sawdust which can be carried out on a production-line basis, which can employ certain self-perpetuating components, and which can be inexpensively performed. It is a further object of the invention to provide a process for converting sawdust into a soil conditioner which will provide a fortified mulch, which will increase the permeability and water retention properties of soil, which will act as a prophylactic for biocide-treated soil, which will provide a nitrogen source for the soil, and which will degenerate into a humus material.

In accordance with the preferred form of the invention, green bulk sawdust is treated with a fungivorous inoculum. The inoculum, which has been partially decomposed, is added at the rate of about five pounds of inoculum to about 95 pounds of the green bulk sawdust to be treated. A nutrient solution is added to the sawdust being treated at a rate to provide about 2.5 pounds of nitrogen per cubic yard of sawdust. This mixture of the sawdust and fungivorous inoculum is then stored from about 10 days to about 20 days and becomes partially decomposed. The partially decomposed sawdust is dried at a temperature of 200° F. or less to a moisture content of about 30%. It is then treated with an Azotobacter inoculum to give the resulting treated sawdust a bacteria concentration of about 1% based upon the weight of the partially decomposed sawdust. The fully treated sawdust is then ready to be packed and held for subsequent or immediate use.

In order to produce the bacteria culture, there is provided a generator comprising a tank having a cylindrical open-ended draft tube supported therein. A diverter is mounted below the draft tube above a tank outlet connected through a pump to a tank inlet for recycling material through said tank. Said inlet is provided with an aerating nozzle connected to an air pressure source. An aerating manifold is also connected to said air pressure source for blowing air through the material in the tank.

An initial charge of Azotobacter bacteria and a liquid nutrient are introduced into the tank, and the tank is aerated with the bacteria and nutrient being recycled through the draft tube and tank. As the bacteria multiply, additional quantities of the nutrient are added to the tank from a make-up tank. A discharge pipe is connected to the bottom of the tank and to a centrifuge for separating the mixture removed from the tank into a first phase consisting primarily of the bacteria and a second phase consisting primarily of the nutrient. Said second phase, which contains small quantities of the bacteria, is then returned to the top of the tank through an inlet tube, and the bacteria in the first phase are used for inoculating the partially decomposed sawdust to produce the fully treated soil conditioner.

Other objects and features of this invention will become apparent from the more detailed description which follows and from the accompanying drawings, in which:

FIG. 1 is a flow diagram of the process embodying the invention;

FIG. 2 is a side elevation partially in section showing the bacteria generator; and FIG. 3 is a horizontal section taken on the line 3—3 of FIG. 2.

The invention comprises the treatment of bulk sawdust with inoculum consisting of a partially decomposed fungivorous sawdust inoculum and a nitrogen bearing nutrient solution, followed by the addition of nitrogen-fixing bacteria. In carrying out the process, the raw sawdust is treated with the fungi inoculum and nutrient, and after it has been partially decomposed, it is then inoculated with Azotobacter to provide the finished soil conditioner. The fungi, supplied with a nutrient, consume the cellulosic constituents of the sawdust and reproduce so that the dead fungi, which are constantly being reproduced for about a two year period, provide a uniformly constant source of nitrogen to the soil to which the soil conditioner is added. The Azotobacter, by extracting nitrogen from the atmosphere, furnish additional nutrient to the fungi. After about two years, when the sawdust has been completely decomposed by the fungi, the residue of the soil conditioner serves as a humus mulch material for improving the physical properties of the soil to which it has been added.

*Inoculum preparation*

In preparing the fungivorous inoculum, sawdust is placed in a mixer, and water is added to bring the moisture content of the sawdust to its fiber saturation point. About 10 pounds of a nutrient solution containing about 40% ammonium nitrate, about 30% urea, and about 30% water is added to a cubic yard of sawdust. Added at this rate, the nutrient solution provides about two to three pounds of nitrogen per cubic yard of sawdust for the composting process. The sawdust and the added water and nutrient solution are then mixed until the mixture of said materials is intimately blended together. The pH of the mixture is then adjusted into the range of about 5.5 to about 7.6. It has been found that an optimum pH for fungivorous growth occurs at 6.6.

After the materials have been fully blended and any necessary pH adjustment made, sawdust-decomposing fungi are added. The following fungi combination has been found to be extremely effective.

| | Percent |
|---|---|
| Pore fungus *Polyporous sulphureus* | 10 |
| Pore fungus *Fomes lucidus* | 10 |
| Pore fungus *Fistutina hepatica* | 10 |
| Pore fungus *genus Boletus* | 10 |
| Gill fungus *Pleuratus ulmarius* | 10 |
| Common leaf mold | 50 |

While this fungi combination produces optimum results, it has been found that the pore fungus *Fomes lucidus*, which attacks the cellulose in the sawdust, produces the most rapid rate of decomposition. About 20 pounds of fungi inoculum per cubic yard of sawdust produces optimum results.

After the fungi have been added to the mixer, the moisture level of the sawdust is again brought to the fiber saturation point, and the mixture is aerated. The temperature of the sawdust is maintained between 70° F. and 100° F., and the pH of the mixture is maintained at about 6.6 The mixture is mixed and aerated for about ten minutes daily. After about 28 to 30 days, the fungal hyphae permeate the sawdust and the culture is then ready to inoculate bulk green sawdust for the production of the soil conditioner or for the production of additional fungivorous culture. Whether it is used to produce the soil conditioner or additional culture material, the culture is added to the bulk green sawdust at the rate of about 5 pounds of culture per 95 pounds of green sawdust. If additional culture is being produced, the processing steps just described are repeated. The fungivorous culture can be stored at a temperature of between 70° F. and 100° F. at pH of about 6.6 for subsequent use.

*Azotobacter production*

To provide Azotobacter cells for treating composted sawdust a 45,000 gallon generator is used. An Azotobacter strain, preferably *Azotobacter vinelandii* or *Azotobacter Chrococcum*, is grown in a revised Burk's nitrogen-free liquid medium, specifically for Azotobacter, which consists of:

| | | |
|---|---|---|
| $K_2HPO_4$ | gm | 0.8 |
| $KH_2PO_4$ | gm | 0.2 |
| $MgSO_4$ | gm | 0.2 |
| NaCl | gm | 0.2 |
| $CaSO_4$ | gm | 0.1 |
| $Fe_2(SO_4)_3$ | gm | 0.01 |
| Water | ml | 1,000 |
| Sucrose | gm | 60 |
| $Na_2MoO_4.2H_2O$ | gm | 0.000252 |

Cultures of Azotobacter are grown in a tank containing 10 liters of the bacteria nutrient solution, and the colonies are allowed to grow for 12 hours with aeration. One-half liter of a bacteria-nutrient solution mixture from the initial tank is then placed in each of 20 additional growth tanks each containing 10 liters of the bacteria nutrient solution. The bacteria in each of the 20 growth tanks is allowed to grow for 12 hours with aeration. The bacteria developed in these 20 tanks are then ready to be added as the initial charge into the bacteria generator shown in FIG. 2.

As shown in FIG. 2, the generator comprises a tank 10 having a lid, 12. Supported within the tank on a plurality of tie rods 14 is an open-ended cylindrical draft tube 16. The draft tube is supported in the tank in a vertical orientation above, and in coaxial alignment with, an inverted conical diverter 18 supported on legs 19 fastened to the tank floor. A drain 20 is provided in the tank floor below the diverter 18 and is connected by a pipe 22 to the inlet of a pump 23 driven by a motor 24. The pump outlet is connected to a pipe 26 terminating in an aerating nozzle 28 supported in the tank immediately above the draft tube 16. The nozzle 28 is connected by a conduit 30 to a blower 32 which forces air through said conduit for discharge through the nozzle 28. A second conduit 34 is also connected to the blower and to an annular manifold 35 resting on the tank floor and provided with a plurality of discharge openings 36.

Nutrient or other material may be introduced into the tank 10 from a make-up tank 38 provided with an agitator 40 driven by a motor 41. A pipe 42 is connected to the bottom of the make-up tank for conveying the materials therein into the tank 10.

The tank 10 is provided with a second drain 44 connected by a pipe 45 to the inlet of a centrifuge 46. The centrifuge has a pair of outlets 47 and 48, with the outlet 48 being interconnected through a surge 50 to pipe 51 for discharging the materials taken off through the outlet 48 back into the tank 10. The centrifuge fraction returned through the pipe 48 normally contains about 10% Azotobacter.

In the operation of the generator, the tank 10 is initially charged with 1000 gallons of the bacteria nutrient solution and the bacteria from the 20 growth tanks. Additional nutrient solution is made in the make-up tank 38 for subsequent addition to the tank 10. After the initial charge of bacteria and nutrient have been added to the tank, the pump 23 will recycle the mixture through the tank, the diverter 18 preventing the foam produced in the tank from blocking the drain 20 to said pump. The blower 32 forces air through the manifold openings 36 and through the nozzle 28 with the recycled mixture to force said mixture downwardly through the draft tube 16 and onto the diverter 18. The air introduced into the tank through the manifold openings 36 and nozzle 28 causes the mixture to form a foam, but the draft tube 16 prevents said mixture from foaming over the top of the tank.

During the first 48 hours of growth additional nutrient solution is added to the tank from the make-up tank 38 until a volume of 20,000 gallons is reached in the tank 10. The Azotobacter culture (Azotobacter and nutrient) is removed from said tank through the drain 44 and pipe 45. The centrifuge 46 will separate off, through the outlet 47, 400 pounds of Azotobacter concentrate per 750 gallons of the mixture every 8 hours. The outlet 48 will feed back into the tank 10 the bulk of the nutrient withdrawn through the pipe 45 and a small quantity of Azotobacter, about 10%, the latter reproducing to thus provide a continuous supply of Azotobacter in said tank.

It is thus seen that the sources of both the fungi and Azotobacter used in the process are self-perpetuating so that once the initial cultures of these organisms are produced a plentiful supply of both organisms is established.

*Sawdust composting process*

In producing the soil conditioner, bulk green sawdust is passed through a wood hog 55 and sized through a three-eighths inch screen 56. The sized sawdust drops onto a conveyor moving under a bin 58 containing the previously prepared fungivorous compost inoculum which is added to the green sawdust at the rate of about 5 pounds of inoculum per 95 pounds of green sawdust. The conveyor next passes under a spray tank 60 containing the nutrient solution for the fungi consisting of 40% ammonium nitrate, 30% urea, and 30% water, and said solution is sprayed onto the sawdust at the rate of about 10 pounds of solution for each cubic yard of sawdust. Additional untreated water is sprayed onto the sawdust from tank 61 to bring its moisture concentration to the fiber saturation point. The treated sawdust is then conveyed into storage bins 62 where it is held for about 10 days, during which time it becomes partially decomposed.

The composted sawdust is withdrawn from the bins 62 and preferably is dried to a moisture content of about 30%, as in a rotating kiln drier 64. If such a drying operation is employed, the kiln is maintained at a temperature below about 200° F. so as not to kill the fungi. After the sawdust has been cooled to about 100° F. in a cooling tower 66, it is moved on a conveyor 67 under a spray tank 68 containing the Azotobacter concentrate withdrawn from the centrifuge outlet 47 shown in FIG. 2. The concentrate, which contains from about .45 pound to about .55 pound of Azotobacter per gallon, is sprayed onto the composted sawdust at the rate of one gallon of concentrate per cubic yard of composted sawdust. The fully inoculated sawdust is then blended in a mixer 70 to insure uniform distribution of the Azotobacter and sawdust throughout the soil conditioner. The soil conditioner is then ready to be placed in bags, drums, or any other suitable container.

*Uses*

The soil conditioner can be applied to the soil by merely spreading it over the surface of the soil or mixing with the soil. It has been found that when the soil conditioner is applied at the rate of about 100 cubic yards per acre excellent results are achieved, although different application rates are recommended for different type soils and different uses. Because of continued decomposition by the fungi, the soil conditioner will supply a relatively constant source of nitrogen to the soil for several years, and after that, the soil conditioner will serve as a humus upgrading the character of the soil.

Our soil conditioner has been tested against peatmoss, vermiculite, ground cobs, and chemical soil conditioner on soils in which various plants and trees have been planted, including row crops, evergreens, flowers, fruit trees, and the like. In such testing, soil permeability, moisture retention, aeration, tilth, heat retention, erosion, emergence, and compaction were determined, and our soil conditioner produced results equal to or superior to the other products tested in most of these categories. It is believed that the factors which permit our soil conditioner to achieve its improved results are its ability to improve water holding capacity, drainage and aeration of soil, provide increased surface for absorption of organic molecule, promote biological activity, and provide slow nutrient release.

We claim:

1. A method of making a soil conditioner, comprising the steps of mixing about 95 pounds of green sawdust with about 5 pounds of a composted fungivorous sawdust culture including a composted mixture of sawdust, a mixture of sawdust-decomposing fungi present in an amount equal to about 20 pounds of said fungi mixture to each cubic yard of said composted mixture of sawdust, and a nitrogen-bearing nutrient present in an amount equal to about 10 pounds of said nitrient to each cubic yard of said composted mixture of sawdust to form a mixture of said green sawdust and culture, spraying a nitrogen-bearing nutrient solution onto said mixture, storing said mixture until it has partially decomposed, and mixing an Azotobacter culture with said mixture at the ratio to provide from about .45 pound to about .55 pound of Azotobacter for each cubic yard of the partially decomposed mixture.

2. The invention as set forth in claim 1 in which said culture has a pH in the range of from about 5.5 to about 7.6.

3. A method of making a soil conditioner, comprising the steps of mixing about 5 pounds of a composted fungivorous sawdust culture with about 95 pounds of green sawdust to form a mixture of said sawdust and culture, spraying a nitrogen-bearing nutrient solution onto said mixture, adjusting the moisture concentration of the mixture to the fiber saturation point of the sawdust, storing said mixture until it has partially decomposed, drying said mixture at a temperature below about 200° F. to a moisture content of about 30%, and mixing an Azotobacter culture with said mixture at the ratio to provide from about .45 pound to about .55 pound of Azotobacter for each cubic yard of the partially decomposed mixture.

4. A method of making a soil conditioner, comprising the steps of preparing a composted fungivorous sawdust culture by mixing about 20 pounds of a mixture of sawdust-decomposing fungi with each cubic yard of sawdust, adding a nitrogen-bearing nutrient to the sawdust at a rate to provide from about 2 pounds to about 3 pounds of nitrogen for each cubic yard of sawdust, adjusting the pH of the mixture into the range of from about 5.5 to about 7.6, adding water to the sawdust to bring its moisture content to the fiber saturation point, and storing said mixture for about 28 days to 30 days at a temperature of from about 70° F. to about 100° F. to produce said composted fungivorous sawdust culture, mixing about 5 pounds of said culture with about 95 pounds of green sawdust to form a mixture of said green sawdust and culture, spraying a nitrogen-bearing nutrient solution onto said mixture, storing said mixture until it has partially decomposed and mixing a Azotobacter culture with said mixture at the ratio to provide from about .45 pound to about .55 pound of Azotobacter for each cubic yard of the partially decomposed mixture.

5. A method of making a soil conditioner, comprising the steps of preparing a composted fungivorous sawdust culture by mixing about 20 pounds of a mixture of sawdust-decomposing fungi with each cubic yard of sawdust, adding a nitrogen-bearing nutrient to the sawdust at a rate to provide from about 2 pounds to about 3 pounds of nitrogen for each cubic yard of sawdust, mixing about 5 pounds of said composted fungivorous sawdust culture with about 95 pounds of green sawdust to form a mixture of said green sawdust and culture, spraying a nitrogen-bearing nutrient solution onto said mixture, and storing said mixture until it has partially decomposed.

6. A method of making a soil conditioner, comprising the steps of preparing a composted fungivorous sawdust culture by mixing about 20 pounds of a mixture of sawdust-decomposing fungi with each cubic yard of sawdust, adding a nitrogen-bearing nutrient to the sawdust at a rate to provide from about 2 pounds to about 3 pounds of nitrogen for each cubic yard of sawdust, adjusting the pH of the mixture into the range of from about 5.5 to about 7.6, adding water to the sawdust to bring its moisture content to the fiber saturation point and storing said mixture for about not more than 30 days at a temperature of from about 70° F. to about 100° F. to produce said composted fungivorous sawdust culture, mixing about 5 pounds of said culture with about 95 pounds of green sawdust to form a mixture of said green sawdust and culture, spraying a nitrogen-bearing nutrient solution onto said mixture, and storing said mixture until it has partially decomposed.

7. A method of making a soil conditioner, comprising the steps of mixing about 5 pounds of a composted fungivorous sawdust culture with about 95 pounds of green sawdust to form a mixture of said sawdust and culture, spraying a nitrogen-bearing nutrient solution onto said mixture, adjusting the moisture concentration of the mixture to the fiber saturation point of the sawdust, storing said mixture until it has partially decomposed, and drying said mixture at a temperature below about 200° F. to a moisture content of about 30%.

References Cited

UNITED STATES PATENTS

| | | | |
|---|---|---|---|
| 1,832,593 | 11/1931 | Szucs | 71—24 X |
| 2,004,706 | 6/1935 | Nuske | 71—26 X |
| 2,820,703 | 1/1958 | Dresser et al. | 71—9 |

OTHER REFERENCES

Burrows, William, Text Book of Microbiology, 16 ed. W. B. Saunders Co., Phila., (1954), pp. 105–106.

HOWARD R. CAINE, *Acting Primary Examiner.*

DONALL H. SYLVESTER, *Examiner.*

T. D. KILEY, *Assistant Examiner.*